United States Patent
Bedard et al.

(10) Patent No.: US 6,428,765 B1
(45) Date of Patent: *Aug. 6, 2002

(54) CRYSTALLINE TANTALUM CONTAINING MULTINARY METAL OXIDE COMPOSITIONS, PROCESSES FOR USING THE COMPOSITION

(75) Inventors: Robert L. Bedard, McHenry; Lisa M. King, Crystal Lake; Paula L. Bogdan, Mt. Prospect; Susan C. Koster, Carpentersville, all of IL (US)

(73) Assignee: UOP LLC, Des Plaines, IL (US)

(*) Notice: Subject to any disclaimer, the term of this patent is extended or adjusted under 35 U.S.C. 154(b) by 32 days.

This patent is subject to a terminal disclaimer.

(21) Appl. No.: 09/746,959

(22) Filed: Dec. 22, 2000

Related U.S. Application Data

(63) Continuation-in-part of application No. 09/309,040, filed on May 10, 1999, now Pat. No. 6,171,571.

(51) Int. Cl.[7] .................. C01G 35/00; C01G 41/02; C01G 39/02; C10G 11/04
(52) U.S. Cl. .................. 423/593; 423/598; 423/600; 423/606; 208/134; 208/135; 208/136; 502/305; 502/311; 502/312; 502/317; 502/353; 502/354
(58) Field of Search .................. 423/593, 598, 423/600, 606; 208/46, 134, 135, 136; 502/305, 311, 312, 317, 353, 354

(56) References Cited

U.S. PATENT DOCUMENTS

| | | | |
|---|---|---|---|
| 4,250,346 A | 2/1981 | Young et al. ............... 585/658 |
| 4,339,355 A | 7/1982 | Decker et al. .............. 252/464 |
| 4,524,236 A | 6/1985 | McCain ...................... 585/658 |
| 4,596,787 A | 6/1986 | Manyik et al. ............. 502/312 |
| 4,892,856 A | 1/1990 | Kawajiri et al. ............ 502/247 |
| 5,281,745 A | * | 1/1994 | Ushikubo et al. |
| 5,750,760 A | 5/1998 | Ushikubo et al. ........... 558/319 |
| 5,807,531 A | 9/1998 | Hibst et al. ................. 423/593 |
| 5,904,911 A | * | 5/1999 | Mori et al. ................. 423/592 |
| 6,063,728 A | * | 5/2000 | Hinago et al. ............. 502/300 |

FOREIGN PATENT DOCUMENTS

JP 11285637 A * 10/1999

OTHER PUBLICATIONS

H. Werner et al., *Catalysis Letters*, 44, (1997) 153–163 "Relevance of a glassy nanocrystalline state of $Mo_4VO_{14}$ for its action as selective oxidation catalyst".
E.M. Thornsteinson et al. *Journal of Catalysis*, 52, 116–132 (1978), "The Oxidative Dehydrogenation of Ethane over Catalysts Containing Mixed Oxides of Molybdenum and Vanadium".
Burch et. al., *Applied Catalysis*, 70, 129–148 (1991).
Ueda et. al., *Applied Catalysis A : General 200*, 2000, 135–143.
Ueda et. al. *Chem. Commun.*, 517–518, (1999).
Burch et al. *Topics in Catalysis*, 3 355–364 (1996).

* cited by examiner

*Primary Examiner*—David Sample
(74) *Attorney, Agent, or Firm*—John G. Tolomei; Frank S. Molinaro

(57) ABSTRACT

A new family of crystalline metal oxide compositions have been synthesized. These compositions are described by the empirical formula:

$$A_n Ta M_x M'_y M''_m O_p$$

where A is an alkali metal cation, ammonium ion and mixtures thereof, M is tungsten, molybdenum, or mixtures thereof. M' is vanadium, antimony, tellurium, niobium and mixtures thereof, and M" is titanium, tin, indium and gallium, aluminum, bismuth and mixtures thereof. M' and M" are optional metals. These compositions are characterized by having an x-ray diffraction pattern having at least one peak at a d spacing of about 3.9 Å. These materials can be used in various hydrocarbon conversion processes such as dehydrogenation.

11 Claims, No Drawings

CRYSTALLINE TANTALUM CONTAINING MULTINARY METAL OXIDE COMPOSITIONS, PROCESSES FOR USING THE COMPOSITION

CROSS-REFERENCE TO RELATED APPLICATION

This application is a continuation-in-part of application Ser. No. 09/309,040 filed May 10, 1999 now U.S. Pat. No. 6,171,571 B1, which is incorporated in its entirety by reference.

FIELD OF THE INVENTION

This invention relates to a new family of crystalline metal oxide compositions. These compositions contain tantalum, an alkali metal, at least one M metal where M is tungsten or molybdenum, optionally a M' metal such as vanadium or niobium and optionally a M" metal such as titanium or tin. This invention also relates to hydrocarbon conversion processes such as dehydrogenation using the composition.

BACKGROUND OF THE INVENTION

Olefins, e.g., propylene or isobutene are used to prepare a number of higher value products such as aldehydes, acids and nitriles. Since the price of the corresponding alkanes, i.e., propane or isobutane is lower than that of the olefins, it would be advantageous to be able to produce the higher value product directly from the alkanes.

Attempts have been made to synthesize novel materials to catalyze the selective oxidation of paraffins. One such catalyst is described in U.S. Pat. No. 5,750,760 where it is disclosed that a multinary composition having the empirical formula:

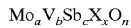

$$Mo_aV_bSb_cX_xO_n$$

where X is an element such as Nb, Ta, W etc. can catalyze the oxidation of an alkane with ammonia in the presence of oxygen. Other compositions which have been disclosed in the art include a $Mo_4VO_{14}$ phase by H. Werner et al. in *Catalysis Letters*, 44 (1997) 153–63. In *J. Catalysis* 52, 116–132 (1978), E. M. Thorsteinson et al., describe a mixed oxide catalyst containing molybdenum and vanadium along with another transition metal such as Ti, Nb, Ta, etc. The authors present activity data and physically characterize the compositions. MoVNb systems have also been described in *Applied Catalysis*, 70 129–148 (1991) and Topics in Catalysis 3, 355–364 (1996). U.S. Pat. No. 4,524,236 discloses a composition containing molybdenum, vanadium, niobium, antimony plus at least one metal such as lithium, barium, titanium etc. U.S. Pat. No. 4,339,355 discloses a composition comprising $Mo_aV_bNb_cX_d$, where X is Co, Cr, Cu, Fe, In, Mn and/or Y. It is further disclosed that the compositions have spinel or perovskite structures. In U.S. Pat. No. 4,596,787 a catalyst comprising $Mo_aV_bNb_cSb_dX_e$ is disclosed, where X includes Li, Sc, Na, Fr, Ta, etc. U.S. Pat. No. 4,250,346 discloses a catalyst with an empirical formula of $Mo_aX_bY_c$, where X is Cr, Mn, Nb, Ta, Ti, V and/or W and Y=Bi, Ce, Co, Cu, Fe, K, Mg, Ni, P, Pb, Sb, Si, Sn, Ti and/or U. U.S. Pat. No. 4,892,856 discloses a catalyst having the composition $Mo_aV_bA_cB_dC_eD_fO_x$ where A is tungsten or niobium, B is Fe, Cu, Bi, Cr, Sb or Tl, C is an alkali or alkaline earth metal and D is Si, Al or Ti. U.S. Pat. No. 5,807,531 discloses a multimetaloxide having an empirical formula of $Mo_{12-a-b-c}V_aM^1_bM^2_cO_x$. However, these materials have a low surface area of 17 m²/g or lower. Finally, Ueda et al., in *Chem. Commun.*, 1999, 517–518, disclose Mo—V—M—O (M=Al, Fe, Cr and Ti) compositions which are hydrothermally synthesized, and in *Applied Catalysis: General*, 2000, 135–143, disclose Mo—V—M—O (M=Al, Sb, Bi, Te) compositions which are hydrothermally synthesized. Although these compositions have a diffraction peak at about 3.9 Å, they do not have applicant's empirical formula (see below).

In contrast to these reports, applicants have synthesized a new family of crystalline oxide compositions based on tantalum, at least one of tungsten and molybdenum, and optionally another metal such as vanadium, niobium, antimony or tellurium. These novel compositions are prepared hydrothermally and are characterized in that they have an x-ray diffraction pattern with at least one peak at a d spacing of about 3.9 Å and a high surface area. These materials show good activity for dehydrogenation of hydrocarbons.

SUMMARY OF THE INVENTION

As stated, this invention relates to a new family of crystalline compositions and processes which use the compositions. Accordingly, one embodiment of the invention is a crystalline metal oxide composition having an empirical formula of:

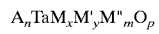

$$A_nTaM_xM'_yM''_mO_p$$

where A is an alkali metal ion, ammonium ion or mixtures thereof, M is selected from the group consisting of molybdenum, tungsten or mixtures thereof, M' is vanadium, antimony, tellurium, niobium and mixtures thereof and M" is selected from the group consisting of tin, titanium, indium, gallium, aluminum, bismuth and mixtures thereof, "n" varies from about 0.1 to about 2, "x" varies from about 0.01 to about 8, "y" varies from zero to about 4, "m" varies from zero to about 0.9 and "p" has a value such that it balances the valence of the combined elements A, Ta, M, M', M", the composition characterized in that it has at least one x-ray diffraction peak at a d spacing of about 3.9±0.15 Å.

Yet another embodiment of the invention is a hydrocarbon conversion process comprising contacting a hydrocarbon with a catalyst at hydrocarbon conversion conditions to give a hydroconverted product, the catalyst comprises one of the compositions described above.

These and other embodiments will become clearer after a detailed description of the invention.

DETAILED DESCRIPTION OF THE INVENTION

A new family of crystalline metal oxide compositions has been synthesized and characterized. These compositions contain tantalum, at least one of tungsten and molybdenum, a third metal selected from vanadium niobium, antimony or tellurium and a fourth metal selected from tin, titanium, indium, gallium and mixtures thereof. A cation such as lithium is also present. These crystalline metal oxides are described by the empirical formula:

$$A_nTaM_xM'_yM''_mO_p$$

where "n" varies from about 0.1 to about 2. The value of "x" varies from about 0.01 to about 8, while the value of "y" varies from zero to about 4 and the value of "m" varies from zero to about 0.9. M is molybdenum, tungsten, or mixtures thereof, M' is selected from the group consisting of vanadium, niobium, antimony, tellurium and mixtures thereof, while M" is tin, titanium, indium, gallium, aluminum, bismuth, and mixtures thereof. Finally, A is an alkali metal cation, an ammonium cation or mixtures thereof. Examples of the alkali metals which can be used include: lithium, sodium, potassium, rubidium, cesium and mixtures thereof.

These novel crystalline metal oxide compositions are hydrothermally prepared. That is, a reaction mixture is prepared from reactive sources of the desired components along with water and heated at a temperature and for a time sufficient to form the desired product. Reactive sources of the alkali metals include the hydroxide, carbonate, halide, acetate, and sulfate compounds. Niobium reactive sources include niobium pentoxide ($Nb_2O_5$), hydrous niobium oxide, niobium ethoxide, and ammonium niobium oxalate. Molybdenum sources include molybdic acid $((NH_4)_6Mo_7O_{24}\cdot 4H_2O)$, molybdenum trioxide ($MoO_3$), sodium molybdate and molybdenum (VI) oxychloride. Tungsten sources include ammonium tungstate, tungsten (VI) oxide, tungsten (VI) chloride, sodium tungstate, and tungstic acid. Vanadium sources include vanadium (V) oxide, vanadium (V) oxychloride, vanadium oxide sulfate, and ammonium vanadate. Tantalum sources include tantalum oxide, hydrous tantalum oxide, tantalum butoxide, tantalum bromide, and tantalum chloride. Tellurium sources include ammonium tellurium oxide, telluric acid, and tellurium oxide. Tin, indium, gallium, aluminum, and bismuth sources include the nitrates and chlorides, while titanium sources include titanium alkoxides, $(NH_4)_2Ti(OH)_2(C_3H_4O_3)_2$ and $TiCl_3$. It should be pointed out that this list is only by way of examples and other reactive sources of individual elements may also be used.

Using the above described reactive sources, a reaction mixture is formed which in terms of molar ratios of the oxides is expressed by the formula:

$$aA_2O:TaO_{5/2}:bMoO_3:cM'O_{5/2}:dM''O_{q/2}:eH_2O$$

where "a" has a value from about 0.75 to about 4, "b" has a value of about 0.02 to about 10, "c" has a value from 0 to about 5, "d" has a value from 0 to about 1, "q" is the valence of M", "e" has a value of about 10 to about 500. Once the reaction mixture is formed, it is required that it have a pH of about 4 to about 10 and preferably from about 6 to about 9. This can be done by using a basic compound of the A cation. Alternatively, the A cation can be added as a non-basic compound and the pH adjusted by the addition of an appropriate amount of an organic base such as an alkyl amine or a tetraalkylammonium hydroxide.

Once the reaction mixture is formed and pH adjusted, it is reacted at a temperature of about 100–225° C. for a period of time of about 1 hr to about 350 hr in a sealed reaction vessel under autogenous pressure. After the allotted time, the mixture is filtered to isolate the solid product which is washed with deionized water and dried in air. Alternatively, the product may be isolated and washed by centrifugation techniques. The product may also be washed with aqueous acid rather than deionized water to convert the composition to the proton exchanged form during workup.

The crystalline metal oxide compositions of the invention are characterized by their unique x-ray diffraction pattern and their surface area. The x-ray diffraction pattern has at least one peak at a d spacing of about 3.9±0.15 Å. A second peak at ½ of the 3.9±0.15 Å spacing is also often present in these compositions. Another X-ray diffraction peak, which is sometimes distinct but usually broad, is located at 10.7±0.25 Å. This peak is always broader than the 3.9 Å peak. Diffuse diffraction peaks are also located between 3.42 and 2.98 Å.

The crystalline metal oxide compositions of the invention are also characterized by their surface areas. These materials generally have a surface area of at least 15 $m^2/g$, and preferably at least 25 $m^2/g$.

The above described compositions can be ion exchanged so that the A cation is exchanged for another, different, cation. These cations which can be exchanged into the metal oxide composition (secondary cations) include, without limitation, other alkali metal ions, hydronium ions, alkaline earth ions, lanthanide ions, divalent transition metal ions, trivalent transition metal ions and organic cations such as amphiphilic ammonium ions, quaternary ammonium cations and alkylpyridinium cations. Ion exchange can be carried out by means well known in the art. The process usually involves contacting the composition with a solution containing the desired cation at exchange conditions. Exchange conditions include a temperature of room temperature to about 100° C. and a time of about 20 minutes to 4 days.

The crystalline compositions of this invention can be used in various hydrocarbon conversion processes. Hydrocarbon conversion processes are well known in the art and include cracking, hydrocracking, alkylation of both aromatics and isoparaffin, isomerization, polymerization, reforming, aromatization, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Patent Nos. 4,310,440 and 4,440,871 which are incorporated by reference. Preferred hydrocarbon conversion processes are reforming aromatization, transalkylation, isomerization, dealkylation and dehydrogenation. Generally these processes are carried out at a pressure of about 10 to about 750 psig, a weight hourly space velocity of about 0.1 to about 30 $hr^{-1}$ with respect to the hydrocarbon, a gas hourly space velocity of about 10 to about 10,000 $hr^{-1}$ with respect to hydrogen and a temperature of about 100° C. to about 650° C.

The compositions of this invention can also be used to catalyze transalkylation. By "transalkylation" is meant the process where an alkyl group on one aromatic nucleus is intermolecularly transferred to a second aromatic nucleus. A preferred transalkylation process is one where one or more alkyl groups of a polyalkylated aromatic compound is transferred to a nonalkylated aromatic compound, and is exemplified by reaction of diisopropylbenzene with benzene to give two molecules of cumene. The reaction conditions for transalkylation include temperatures in the range of about 100° to about 250° C., pressures in the range of 100 to about 750 psig, and a molar ratio of unalkylated aromatic to polyalkylated aromatic in the range from about 1 to about 10.

The following examples are set forth in order to more fully illustrate the invention. It is to be understood that the examples are only by way of illustration and are not intended as an undue limitation on the broad scope of the invention as set forth in the appended claims.

EXAMPLE 1

Amorphous hydrous $Ta_2O_5$ was prepared by adding 34.0 g of $TaCl_5\cdot nH_2O$ to 2000 g of deionized water. The pH of this mixture was adjusted to 10.37 using 147.0 g of concentrated $NH_4OH$ which gave a precipitate which was isolated by filtration. The solid precipitate was washed with 2000 ml of deionized water and partially dried. A reaction mixture was prepared by suspending 27.04 g $Ta_2O_5$: 13 $H_2O$, prepared above, in 48.3 g of deionized water and adding to it a homogeneous powder of 1.50 g $Li_2CO_3$ and 23.03 g $MoO_3$. The resultant reaction mixture was stirred for one hour and was found to have a pH of 5.02 and a composition in terms of molar oxide ratios of;

$$0.25Li_2O:0.50Ta_2O_5:2.0MoO_3:40H_2O$$

The reaction mixture was divided into 4 portions and reacted under autogenous pressure for 24 and 72 hours at either 200° C. or 225° C. The solid product from each reaction was isolated by centrifugation, washed and then dried at 100° C. The product from the 72 hour at 225° C. reaction was found to have an intense x-ray diffraction peak at a d-spacing of about 3.95 Å. Elemental analysis showed that the product had an empirical formula of:

$$Li_{0.65}Ta\ Mo_{2.13}O_{9.21}:2.48H_2O$$

The $N_2$ BET surface area was determined to be 141 m²/g. This product was identified as sample A.

EXAMPLE 2

Into a container there were placed 42.6 g of a solution prepared by dissolving 13.1 g of LiCl in 50.4 g deionized water. To this solution there were added 29.1 g of an aqueous solution formed by dissolving 20.7 g of $(NH_4)_6W_{12}O_{39}:nH_2O$ in 25.3 g of deionized water. To the resultant clear solution there were added 107.1 g of a solution prepared by mixing 32.7 g $Ta(OC_2H_5)_5$ in 150.1 g ethylene glycol. After addition of the tantalum solution, the mixture was stirred vigorously and found to have a pH of 4.42. The pH was adjusted to 6.44 by adding 1.0 g of concentrated ammonium hydroxide while stirring. The reaction mixture was found to have a composition of:

$$0.8NH_3:0.5Li_2O:0.5Ta_2O_5:2WO_3:9HOCH_2CH_2OH:35H_2O$$

After stirring the reaction mixture for one hour, it was split into 6 aliquots, loaded into Teflon lined reactors and reacted under autogenous pressure at 200° C. and 225° C. for periods of 3, 7 and 14 days. At the end of the reaction times, the reactors were cooled to room temperature where the solid products were isolated by vacuum filtration, washed and then dried. X-ray diffraction analysis of the samples revealed the presence of diffraction peaks at about 3.9 Å, but also contained about 10–20% of a pyrochlore-type impurity. Elemental analysis showed that the above products have an empirical formula expressed as the ratio of the oxides of:

Elemental Analysis for Li-Ta-W-O materials

| Sample ID | Crystallization Conditions | Product Formula |
| --- | --- | --- |
| B | 72 hours at 200° C. | $Li_{0.25}\ Ta\ W_{1.56}\ O_{7.29}:4.33\ H_2O$ |
| C | 168 hours at 200° C. | $Li_{0.22}\ Ta\ W_{1.62}\ O_{7.46}:3.71\ H_2O$ |
| D | 336 hours at 225° C. | $Li_{0.23}\ Ta\ W_{1.67}\ O_{7.62}:11.17\ H_2O$ |

Nitrogen BET surface area was found to be 87 m²/g for sample D.

EXAMPLE 3

In a beaker there were placed 47.8 g of a solution prepared by dissolving 13.1 g LiCl in 50.1 g distilled water. To this solution there were added 35.2 g of a solution prepared by dissolving 12.45 g of $(NH_4)_6W_{12}O_{39}:nH_2O$ in 25.3 g of distilled water. To the resulting clear solution there were added 179 g of a solution prepared by mixing 37.2 g of $Ta(OEt)_5$ in 150.6 g of ethylene glycol. To the creamy gel which formed, 60 g of distilled water were added followed by 10.84 g of concentrated $NH_4OH$ in order to adjust the pH from 4.54 to 6.8. The reaction mixture was found to have the following composition:

$$0.95NH_3:0.5Li_2O:0.5Ta_2O_5:WO_3:9HOCH_2CH_2OH:35H_2O$$

The mixture was stirred for 1 hour and then divided into 9 aliquots which were loaded in to Teflon lined reactors and the mixtures reacted for 1, 5 and 7 days at 150° C., 200° C. and 225° C. At the end of the reaction times, the solid products were isolated by vacuum filtration, washed and dried in air. Elemental analysis showed the solid product to have a composition expressed by the formulas:

| Sample ID | Crystallization Conditions | Product Formula |
| --- | --- | --- |
| E | 72 hours at 150° C. | $Li_{0.01}\ Ta\ W_{0.37}\ O_{3.69}:1.75\ H_2O$ |
| F | 72 hours at 200° C. | $Li_{0.00}\ Ta\ W_{0.37}\ O_{3.59}:2.95\ H_2O$ |
| G | 72 hours at 225° C. | $Li_{0.00}\ Ta\ W_{0.37}\ O_{3.59}:2.52\ H_2O$ |

EXAMPLE 4

In a beaker, there were added 55.8 g of an aqueous solution having the composition $LiCl:9H_2O$ and to it there were added 183.5 g of an aqueous solution having the composition $(NH_4)_6Mo_7O_{24}:196\ H_2O$ to give a clear solution to which there were added 41.0 g of an aqueous solution having the composition $(NH_4)_6W_{12}O_{39}:200\ H_2O$ to give a clear solution. Finally, 63.0 g of a solution having a composition $Ta(OC_2H_5)_5:30$ ethylene glycol was added which resulted in a thin white gel having a pH of 5.63.

The composition of the reaction mixture in terms of molar oxide ratios was determined to be:

$$0.5Li_2O:0.15Ta_2O_5:MoO_3:WO_3:9HOCH_2CH_2OH:43.4H_2O$$

After stirring the mixture for 1 hour, it was split into several aliquots, loaded into Teflon lined reactors and the mixtures reacted either quiescent or tumbled (in an oven equipped with a rotisserie rack) at 150° C. and 200° C. for various times. When the reaction times were completed, the solid products were isolated by vacuum filtration, washed and then dried in ambient air. The solid reaction product which was reacted with tumbling for 72 hours for 150° C. was found to have a x-ray diffraction peak at a d-spacing of 3.91 Å. Elemental analysis was carried out on this product and found to have a composition described by the empirical formula of:

$$Li_{0.37}Ta\ W_{2.29}Mo_{5.11}O_{24.89}:9.54H_2O$$

Nitrogen BET surface area for the sample was found to be 70 m²/g. This product was identified as sample H.

A 3.5 g portion of the solid product obtained above was slurried in 200 mL of 1M $HNO_3$ for 2 hours at room temperature, vacuum filtered to isolate the solid product and then washed with 500 mL 1 M $HNO_3$. This product was identified as Sample I.

EXAMPLE 5

Into a beaker there were added 20.7 g of an aqueous solution having the composition $LiCl:9H_2O$ to which 34.0 g of an aqueous solution having the composition $(NH_4)_6Mo_7O_{24}:196\ H_2O$ was added. To the resultant clear solution, 13.9 g of an aqueous solution having the composition $(NH_4)_6W_{12}O_{39}:200\ H_2O$ were added followed by the addition of 60.0 g of a solution having the composition Ta(OC$_2$H$_5$)$_5$:30 ethylene glycol to give a thin white gel having a pH of 6.24.

The composition of the reaction mixture in terms of molar oxide ratios was found to be:

0.5Li$_2$O:0.39Ta$_2$O$_5$:0.5MoO$_3$:0.92WO$_3$:7HOCH$_2$CH$_2$OH:43.4H$_2$O

The mixture was stirred for an hour, split into several aliquots which were loaded into Teflon lined reactors and the mixtures reacted at either 150° C. or 200° C. for various times under quiescent autogenous conditions. At the completion of the reaction times, the solid products were isolated by vacuum filtration, washed and then dried at ambient air.

The solid product obtained after 72 hours at 150° C. with tumbling was found to have a x-ray diffraction peak at 3.84 Å. Elemental analysis of this product gave a composition having the empirical formula of:

Li$_{0.37}$Ta WO$_{0.92}$Mo$_{1.46}$ O$_{10.29}$:9.81H$_2$O

Nitrogen BET surface area was measured to be 145 m2/g. This product was identified as sample J.

A 3.5 g portion of the solid product obtained above was slurried in 200 mL of 1M HNO$_3$ for 2 hours at room temperature, vacuum filtered to isolate the solid product and then washed with 500 mL 1 M HNO$_3$. After drying, elemental analysis showed that this product contained less than 0.002 wt. % Li and gave a composition with the empirical formula of:

Ta W$_{0.93}$Mo$_{1.39}$O$_{9.45}$:5.81H$_2$O.

Nitrogen BET surface area was found to be 125 m$^2$/g. This product was identified as product K.

EXAMPLE 6

To 292 g of an aqueous solution having the composition LiCl:9H20 there were added 509.7 g of an aqueous solution having the composition (NH$_4$)$_6$Mo$_7$O$_{24}$:196 H$_2$O, followed by the addition of 153.7 g of an aqueous solution having the composition (NH$_4$)$_6$W$_{12}$O$_{39}$:200 H$_2$O. Finally, 744.0 g of a solution having the composition 0.27 Ta(OC$_2$H$_5$)$_5$:0.75 Nb(OC$_2$H$_5$)$_5$:30 ethylene glycol was added and a thin white gel having a pH 6.07 formed.

The composition of the reaction mixture in terms of molar oxide ratios was found to be:

0.5Li$_2$O:0.75Ta$_2$O$_5$:0.27Nb$_2$O$_5$:0.5MoO$_3$:0.5WO$_3$:30HOCH$_2$CH$_2$OH:33H$_2$O

A 436.8 g portion of this reaction mixture was loaded into a Teflon lined stirred reactor and the mixture reacted for 8 hours at 150° C. After cooling to room temperature, the solid product was isolated by vacuum filtration, washed and then dried at ambient air. Elemental analysis of the product gave a composition having an empirical formula of:

Li$_{0.22}$Nb$_{0.39}$Ta W$_{1.08}$Mo$_{2.34}$O$_{13.9}$:14.42H$_2$O

Nitrogen BET surface area was measured to be 161 m$^2$/g. This product was identified as sample L. A 3.5 g portion of sample L was slurried in 200 mL of 1M HNO$_3$ for 2 hours at room temperature, vacuum filtered to isolate the solid product and then washed with 500 mL 1 M HNO$_3$. This product was identified as sample M.

EXAMPLE 7

Samples from Examples 1, 2, 3 and 6 were tested for the dehydrogenation of methylcyclohexane (MCH) to toluene using the following procedure. In a reactor there were placed 250 mg (40–60 mesh) of the sample to be tested and the sample was pretreated at 565° C. for 180 min. in hydrogen. The sample was then cooled to 300° C. under hydrogen. Over this sample there was flowed, at a rate of 250 cc/min, methylcyclohexane that was saturated with hydrogen at 0° C. The temperature was then increased and measurements taken at 300° C., 325° C., 350° C., 375° C., 400° C., 450° C. and 500° C. Analysis of the effluent was carried out using a GC analyzer. The results of these experiments 10 are shown in Table 1.

TABLE 1

Methylcyclohexane Conversion for Various Compositions

| Sample ID | Conversion at Stated Temperature | | | | | | |
|---|---|---|---|---|---|---|---|
| | 300° C. | 325° C. | 350° C. | 375° C. | 400° C. | 450° C. | 500° C. |
| A | 4.89 | 9.07 | 15.05 | 21.67 | 29.7 | 49.4 | 68.9 |
| B | 0.97 | 1.56 | 2.31 | 3.08 | 4.18 | 8.88 | 17.9 |
| C | 1.05 | 1.65 | 2.33 | 37.5 | 3.97 | 8.66 | 17.5 |
| D | 5.23 | 7.29 | 9.42 | 11.1 | 13.6 | 22.9 | 35.1 |
| F | 0.87 | 1.18 | 1.35 | 1.57 | 1.97 | 3.79 | 67.4 |
| L | 3.51 | 6.40 | 10.05 | 12.45 | 13.87 | 20.71 | 34.19 |

Analysis of the products obtained at 500° C. is shown in Table 2.

TABLE 2

Product Distribution (%) of Various Compositions at 500° C.

| Sample ID | Benzene | Cyclohexane | MCH | Toluene | Unknowns |
|---|---|---|---|---|---|
| A | 2.53 | 0 | 31.13 | 64.01 | 0.59 |
| B | 0.53 | 0 | 82.13 | 15.09 | 0.91 |
| C | 0.45 | 0 | 82.55 | 14.84 | 0.83 |
| D | 6.76 | 0 | 64.94 | 30.74 | 0.87 |
| F | 0.12 | 0 | 93.26 | 5.14 | 0.88 |
| L | 0.69 | 0 | 65.81 | 31.47 | 0.67 |

The results in Tables 1 and 2 show that the compositions of this invention have good dehydrogenation activity.

EXAMPLE 8

Several samples were tested for heptane cracking using the following test procedure. In a reactor there were placed 250 mg (40–60 mesh) of a given sample and the sample was pretreated at 400° C. for 1 hour under hydrogen and then cooled to 350° C. Over this sample there was flowed, at a rate of 125 cc/min., a feedstream of n-heptane that was saturated with hydrogen at 0° C. The temperature was then raised and measurements taken at 350° C., 400° C., 450° C. and 500° C. Analysis of the effluent was carried out using a GC analyzer. Conversion at various temperatures is shown in Table 3.

TABLE 3

Heptane Conversion vs. Temperature for Various Compositions

| Sample ID | Conversion (%) at stated Temperature | | | |
|---|---|---|---|---|
| | 300° C. | 350° C. | 400° C. | 500° C. |
| B | 0.60 | 0.56 | 0.55 | 3.89 |
| C | 0.51 | 0.55 | 0.65 | 4.03 |
| D | 0.54 | 1.02 | 3.25 | 18.71 |

TABLE 3-continued

Heptane Conversion vs. Temperature for Various Compositions

| | Conversion (%) at stated Temperature | | | |
|---|---|---|---|---|
| Sample ID | 300° C. | 350° C. | 400° C. | 500° C. |
| H | 6.56 | 21.12 | 23.43 | 24.25 |
| I | 13.79 | 22.4 | 24.47 | 31.97 |
| J | 0.47 | 0.5 | 0.78 | 5.77 |
| K | 8.7 | 17.42 | 16.84 | 17.87 |
| L | 0.66 | 1.56 | 3.17 | 11.39 |
| M | 9.37 | 15.56 | 14.95 | 17.83 |

Analysis of the products produced at 500° C. are presented in Table 4.

TABLE 4

Product Distribution (%) of Various Compositions at 500° C.

| Sample ID | Aromatics | Isomerized products | Napthenes | Cracking | Unknowns |
|---|---|---|---|---|---|
| B | 0.24 | 1.45 | 0.61 | 1.44 | 0.15 |
| C | 0.28 | 1.41 | 0.64 | 1.54 | 0.16 |
| D | 5.59 | 0.81 | 0.76 | 8.41 | 3.14 |
| H | 10.17 | 1.72 | 1.37 | 9.98 | 1.01 |
| I | 18.04 | 1.46 | 0.82 | 11.66 | 0 |
| J | 1.63 | 1.35 | 1.33 | 1.44 | 0.03 |
| K | 8.05 | 2.19 | 1.17 | 6.38 | 0.08 |
| L | 4.71 | 1.41 | 1.62 | 3.66 | 0 |
| M | 8.31 | 1.51 | 0.99 | 7.02 | 0 |

The data in Table 4 show that the compositions of this invention have significant acidity, can isomerize paraffins and aromatize n-heptane.

We claim as our invention:

1. A crystalline metal oxide composition having an empirical formula of:

$$A_n TaM_x M'_y M''_m O_p$$

where A is a cation selected from the group consisting of an alkali metal ion, ammonium ion or mixtures thereof, M is molybdenum, tungsten and mixtures thereof, M' is selected from the group consisting of vanadium, antimony, tellurium, niobium and mixtures thereof, and M" is selected from the group consisting of titanium, tin, indium, gallium, aluminum, bismuth and mixtures thereof, "n" varies from about 0.1 to about 2, "x" varies from about 0.01 to about 8, "y" varies from zero to about 4, "m" varies from zero to about 0.9 and "p" has a value such that it balances the valence of the combined elements, A, Ta, M, M', M", the composition characterized in that it has at least one x-ray diffraction peak at a d spacing of about 3.9±0.15 Å.

2. The composition of claim 1 where A is lithium.

3. The composition of claim 1 where M is molybdenum.

4. The composition of claim 1 where M is a mixture of molybdenum and tungsten.

5. The composition of claim 1 further characterized in that the A cation has been exchanged for a secondary cation selected from the group consisting of hydronium ions, alkali ions, alkaline earth ions, lanthanide ions, divalent transition metal ions, trivalent transition metal ions, organic cations and mixtures thereof.

6. A hydrocarbon conversion process comprising contacting a hydrocarbon with a catalyst at hydrocarbon conversion conditions to give a hydroconverted product, the catalyst comprising a crystalline composition having an empirical formula of:

$$A_n TaM_x M'_y M''_m O_p$$

where A is a cation selected from the group consisting of an alkali metal ion, ammonium ion or mixtures thereof, M is molybdenum, tungsten or mixtures thereof, M' is selected from the group consisting of vanadium, antimony, tellurium, niobium and mixtures thereof, and M" is selected from the group consisting of titanium, tin, indium, gallium, aluminum, bismuth and mixtures thereof, "n" varies from about 0.1 to about 2, "x" varies from about 0.01 to about 8, "y" varies from zero to about 4, "m" varies from zero to about 0.9 and "p" has a value such that it balances the valence of the combined elements, A, Ta, M, M', M", the composition characterized in that it has at least one x-ray diffraction peak at a d spacing of about 3.9±0.15 Å.

7. The process of claim 6 where the hydrocarbon conversion process is dehydrogenation.

8. The process of claim 6 where the hydrocarbon conversion process is aromatization.

9. The process of claim 6 where the hydrocarbon conversion process is isomerization.

10. The process of claim 6 where the hydrocarbon conversion process is transalkylation.

11. The process of claim 6 where the hydrocarbon conversion process is reforming.

* * * * *